(12) United States Patent
Chiang et al.

(10) Patent No.: US 11,178,414 B2
(45) Date of Patent: Nov. 16, 2021

(54) CLASSIFICATION FOR MULTIPLE MERGE TOOLS

(71) Applicant: MediaTek Inc., Hsinchu (TW)

(72) Inventors: Man-Shu Chiang, Hsinchu (TW); Chun-Chia Chen, Hsinchu (TW); Chih-Wei Hsu, Hsinchu (TW); Chia-Ming Tsai, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/802,455

(22) Filed: Feb. 26, 2020

(65) Prior Publication Data

US 2020/0275115 A1 Aug. 27, 2020

Related U.S. Application Data

(60) Provisional application No. 62/810,997, filed on Feb. 27, 2019.

(51) Int. Cl.
| | | |
|---|---|---|
| *H04N 7/12* | (2006.01) | |
| *H04N 19/44* | (2014.01) | |
| *H04N 19/176* | (2014.01) | |
| *H04N 19/159* | (2014.01) | |
| *H04N 19/107* | (2014.01) | |
| *H04N 19/46* | (2014.01) | |
| *H04N 19/189* | (2014.01) | |

(52) U.S. Cl.
CPC .......... *H04N 19/44* (2014.11); *H04N 19/107* (2014.11); *H04N 19/159* (2014.11); *H04N 19/176* (2014.11); *H04N 19/189* (2014.11); *H04N 19/46* (2014.11)

(58) Field of Classification Search
CPC ... H04N 19/107; H04N 19/159; H04N 19/189
See application file for complete search history.

(56) References Cited

U.S. PATENT DOCUMENTS

2018/0184117 A1 6/2018 Chen et al.
2018/0278949 A1 9/2018 Karczewicz et al.

FOREIGN PATENT DOCUMENTS

WO  WO 2018237303 A1  12/2018

OTHER PUBLICATIONS

Taiwan Intellectual Property Office, Office Action for Taiwan Patent Application No. 109106446, dated Mar. 17, 2021.
Taiwan Intellectual Property Office, Office Action for Taiwan Patent Application No. 109106443, dated Apr. 13, 2021.
(Continued)

*Primary Examiner* — Y Lee
(74) *Attorney, Agent, or Firm* — Han IP PLLC; Andy M. Han

(57) ABSTRACT

A video codec receives data to be encoded or decoded as a current block of a current picture of a video. first and/or second flags indicate whether to apply a first combined prediction mode or a second combined prediction mode. The video codec decodes or encodes the current block. When the combined inter and intra prediction mode is applied, the current block is coded by using a combined prediction that is generated based on an inter-prediction and an intra-prediction. When the triangle prediction mode is applied, the current block is coded by using a combined prediction that is generated based on at least two inter-predictions.

10 Claims, 12 Drawing Sheets

(56) References Cited

OTHER PUBLICATIONS

Panasonic, Description of SDR video coding technology proposal by Panasonic, Joint Video Experts Team (JVET) of ITU-T SG 16 WP 3 and ISO/IEC JTC 1/SC 29/WG 11, JVET-J0020-v1, 10th Meeting, San Diego, US, Apr. 10-20, 2018.
Qualcomm Incorporated, Intra-prediction Mode Propagation for Inter-pictures, Joint Video Experts Team (JVET) of ITU-T SG 16 WP 3 and ISO/IEC JTC 1/SC 29/WG 11, JVET-J0053, 10th Meeting, San Diego, US, Apr. 10-20, 2018.

CLASSIFICATION FOR MULTIPLE MERGE TOOLS

CROSS REFERENCE TO RELATED PATENT APPLICATION(S)

The present disclosure is part of a non-provisional application that claims the priority benefit of U.S. Provisional Patent Application No. 62/810,997, filed on 27 Feb. 2019, respectively. Contents of above-listed applications are herein incorporated by reference.

TECHNICAL FIELD

The present disclosure relates generally to video processing. In particular, the present disclosure relates to methods of signaling coding modes.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for signaling coding modes using flags that correspond to classification of different types of merge modes. A video codec receives data to be encoded or decoded as a current block of a current picture of a video. First and second flags indicate whether to apply a first combined prediction mode or a second combined prediction mode. The video codec decodes or encodes the current block. When the combined inter and intra prediction mode is applied, the current block is coded by using a combined prediction that is generated based on an inter-prediction and an intra-prediction. When the triangle prediction mode is applied, the current block is coded by using a combined prediction that is generated based on at least two inter-predictions. The combined inter and intra prediction mode and the triangle prediction mode are taken as a group for combined prediction modes.

The first flag indicates whether a multi-hypothesis prediction mode (different from regular merge mode) is applied to combine two prediction signals to generate a combined prediction for decoding or encoding the current block. The second flag selects combined inter and intra prediction mode or triangle prediction mode. In some embodiments, when the triangle prediction mode is applied, the video codec combines a first inter-prediction signal with a second inter-prediction signal to generate the combined prediction for a diagonal region between two triangular prediction units of the current block. In some embodiments, when the triangle prediction mode is applied, the video codec combines a first inter-prediction signal with a second inter-prediction signal to generate the combined prediction for an overlap prediction region that is defined based on a partitioning along a straight line bifurcating the current block, the straight line being a diagonal line connecting two opposing vertices of the current block or the straight line being represented by an angle and a distance from the center of the current block, and the combined prediction is a weighted sum of the first inter-prediction signal and the second inter-prediction signal.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates the motion candidates of merge mode.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Merge Mode

Figure 1:
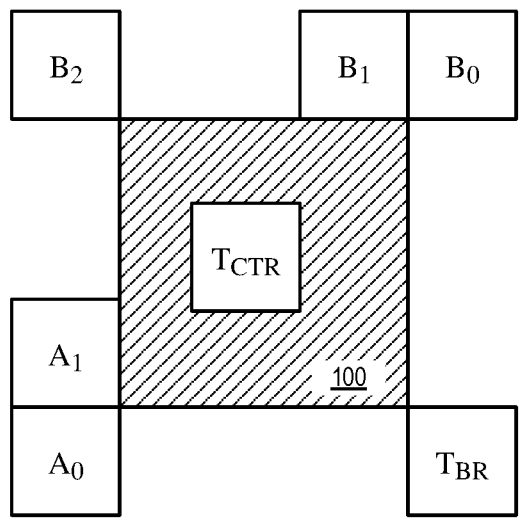

FIG. 1 illustrates the motion candidates of merge mode. As illustrated, up to four spatial MV candidates are derived from A0, A1, B0 and B1, and one temporal MV candidate is derived from TBR or TCTR (TBR is used first, if TBR is not available, TCTR is used instead). If any of the four spatial MV candidates is not available, the position B2 is then used to derive MV candidate as a replacement. After the derivation process of the four spatial MV candidates and one temporal MV candidate, removing redundancy (pruning) is applied in some embodiments to remove redundant MV candidates. If after removing redundancy (pruning), the number of available MV candidates is smaller than five, three types of additional candidates are derived and are added to the candidate set (candidate list). A video encoder selects one final candidate within the candidate set for Skip or Merge modes based on the rate-distortion optimization (RDO) decision, and transmits the index to a video decoder. (Skip mode and merge mode are collectively referred to as "merge mode" in this document.)

II. Intra-Prediction Mode

Intra-prediction method exploits one reference tier adjacent to the current prediction unit (PU) and one of the intra-prediction modes to generate the predictors for the current PU. The Intra-prediction direction can be chosen among a mode set containing multiple prediction directions. For each PU coded by Intra-prediction, one index will be used and encoded to select one of the intra-prediction modes. The corresponding prediction will be generated and then the residuals can be derived and transformed.

When a PU is coded in Intra mode, pulse code modulation (PCM) mode or intra mode can be used. In PCM mode, the prediction, transform, quantization and entropy coding are bypassed, and the samples are directly represented by a pre-defined number of bits. Its main purpose is to avoid excessive consumption of bits when the signal characteristics are extremely unusual and cannot be properly handled by hybrid coding (e.g., noise-like signals). In intra mode, traditionally, the intra prediction method only exploits one reference tier adjacent to the current prediction unit (PU) and one of the intra prediction modes to generate the predictors for the current PU.

Figure 2:
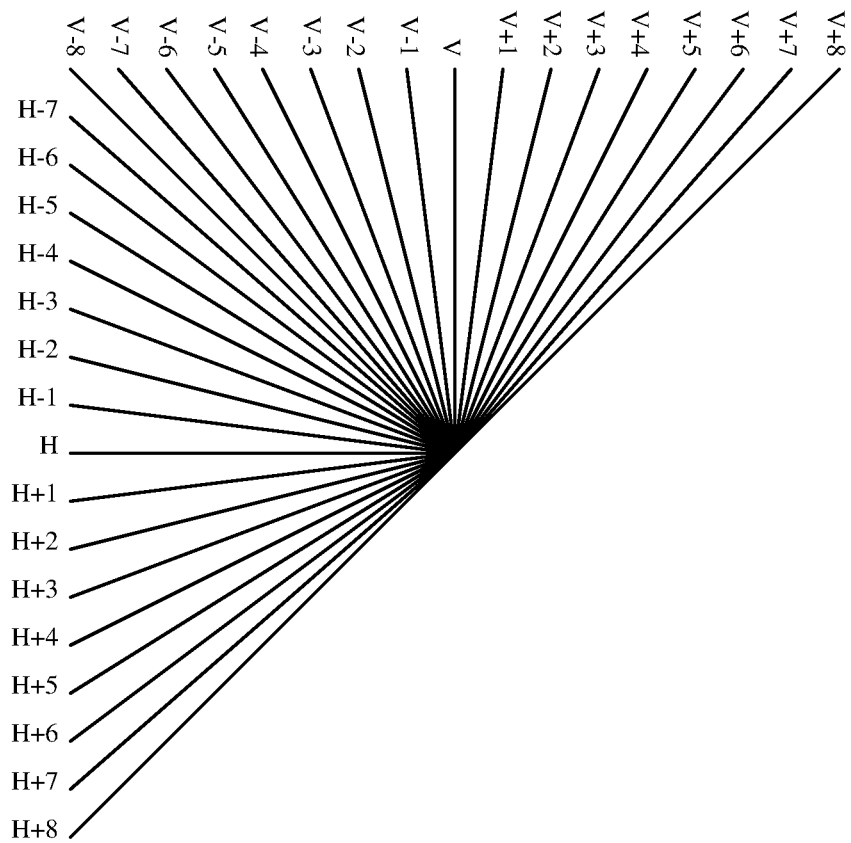
FIG. 2 shows the intra-prediction modes in different directions.

FIG. 2 shows the intra-prediction modes in different directions. These intra-prediction modes are referred to as directional modes and do not include DC mode or Planar mode. As illustrated, there are 33 directional modes (V: vertical direction; H: horizontal direction), so H, H+1~H+8, H−1~H−7, V, V+1~V+8, V−1~V−8 are used. Generally directional modes can be represented as either as H+k or V+k modes, where k=±1, ±2, . . . , ±8. (In some embodiments, intra-prediction mode has 65 directional modes so that the range of k is from ±1 to ±16.)

Out of the 35 intra-prediction modes in HEVC, 3 modes are considered as the most probable modes (MPM) for predicting the intra-prediction mode in current prediction block. These three modes are selected as an MPM set. For example, the intra-prediction mode used in the left prediction block and the intra-prediction mode used in the above prediction block are used as MPMs. When the intra-prediction modes in two neighboring blocks use the same intra-prediction mode, the intra-prediction mode can be used as an MPM. When only one of the two neighboring blocks is available and coded in directional mode, the two neighboring directions immediately next to this directional mode can be used as MPMs. DC mode and Planar mode are also considered as MPMs to fill the available spots in the MPM set, especially if the above or top neighboring blocks are not available or not coded in intra-prediction, or if the intra-prediction modes in neighboring blocks are not directional modes. If the intra-prediction mode for current prediction block is one of the modes in the MPM set, 1 or 2 bits are used to signal which one it is. Otherwise, the intra-prediction mode of the current block is not the same as any entry in the MPM set, and the current block will be coded as a non-MPM mode. There are all-together 32 such non-MPM modes and a (5-bit) fixed length coding method is applied to signal this mode.

III. Combined Inter and Intra Prediction (CIIP)

In some embodiments, when the enabling conditions for CIIP are satisfied, the CU-level syntax for CIIP is signaled. For example, an additional flag is signaled to indicate if the combined inter/intra prediction (CIIP) mode is applied to the current CU. The enabling conditions may include the CU is coded in merge mode, and the CU contains at least 64 luma samples (that is, CU width times CU height is equal to or larger than 64), In order to form the CIIP prediction, an intra prediction mode is needed. One or more possible intra prediction modes can be used: for example, DC, planar, horizontal, or vertical. Then, the inter prediction and intra prediction signals are derived using regular intra and inter decoding processes. Finally, weighted averaging of the inter and intra prediction signals is performed to obtain the CIIP prediction.

In some embodiments, if only one intra prediction mode (e.g. planar) is available for CIIP, the intra prediction mode for CIIP can be implicitly assigned with that mode (e.g. planar). In some embodiments, up to 4 intra prediction modes, including DC, PLANAR, HORIZONTAL, and VERTICAL modes, can be used to predict the luma component in the CIIP mode. For example, if the CU shape is very wide (that is, width is more than two times of height), then the HORIZONTAL mode is not allowed; if the CU shape is very narrow (that is, height is more than two times of width), then the VERTICAL mode is not allowed. In these cases, only 3 intra prediction modes are allowed. The CIIP mode may use three most probable modes (MPM) for intra prediction. If the CU shape is very wide or very narrow as defined above, the MPM flag is inferred to be 1 without signalling. Otherwise, an MPM flag is signalled to indicate if the CIIP intra prediction mode is one of the CIIP MPM candidate modes. If the MPM flag is 1, an MPM index is further signalled to indicate which one of the MPM candidate modes is used in CIIP intra prediction. Otherwise, if the MPM flag is 0, the intra prediction mode is set to the "missing" mode in the MPM candidate list. For example, if the PLANAR mode is not in the MPM candidate list, then PLANAR is the missing mode, and the intra prediction mode is set to PLANAR. Since 4 possible intra prediction modes are allowed in CIIP, and the MPM candidate list contains only 3 intra prediction modes, one of the 4 possible modes must be the missing mode. The intra prediction mode of a CIIP-coded CU will be saved and used in the intra mode coding of the future neighbouring CUs.

The inter prediction signal (or inter-prediction) in the CIIP mode $P_{inter}$ is derived using the same inter prediction process applied to regular merge mode; and the intra-prediction or intra prediction signal $P_{intra}$ is derived using the CIIP intra prediction mode following the regular intra prediction process. The intra and inter prediction signals are then combined using weighted averaging, where the weight value depends on the neighboring blocks, depends on the intra prediction mode, or depends on where the sample is located in the coding block. In some embodiments, if the intra prediction mode is the DC or planar mode, or if the block width or height is smaller than 4, then equal weights are applied to the intra prediction and the inter prediction signals. Otherwise, the weights are determined based on the intra prediction mode (either horizontal mode or vertical mode in this case) and the sample location in the block. Starting from the part closest to the intra prediction reference samples and ending at the part farthest away from the intra prediction reference samples, the weight wt for each of the 4 regions is set to 6, 5, 3, and 2, respectively. In some embodiments, the CIIP prediction or CIIP prediction signal $P_{CIIP}$ is derived according to:

$$P_{CIIP}=((N1-wt)*P_{inter}+wt*P_{intra}+N2)>>N3$$

Where (N1, N2, N3)=(8, 4, 3) or (N1, N2, N3)=(4, 2, 2). When (N1, N2, N3)=(4, 2, 2), wt is selected from 1, 2, or 3.

IV. Target Merge Mode (TPM)

In some embodiments, triangular prediction unit mode (TPM) is used to perform inter-prediction for a CU. Under TPM, a CU is split into two triangular prediction units, in either diagonal or inverse diagonal direction. Each triangular prediction unit in the CU is inter-predicted using its own uni-prediction motion vector and reference frame. In other words, the CU is partitioned along a straight line bifurcating the current block. The transform and quantization process are then applied to the whole CU. In some embodiments, this mode is only applied to skip and merge modes. In some embodiment, TPM can be extended as splitting a CU into two prediction units with a straight line, which can be represented by an angle and a distance. The splitting line can be indicated with a signaled index and the signaled index is then mapped to an angle and a distance. In addition, one or more indexes are signaled to indicate the motion candidates for the two partitions. After predicting each prediction unit, an adaptive weighting process is applied to the diagonal edge between the two prediction units to derive the final prediction for the whole CU.

Figure 3:
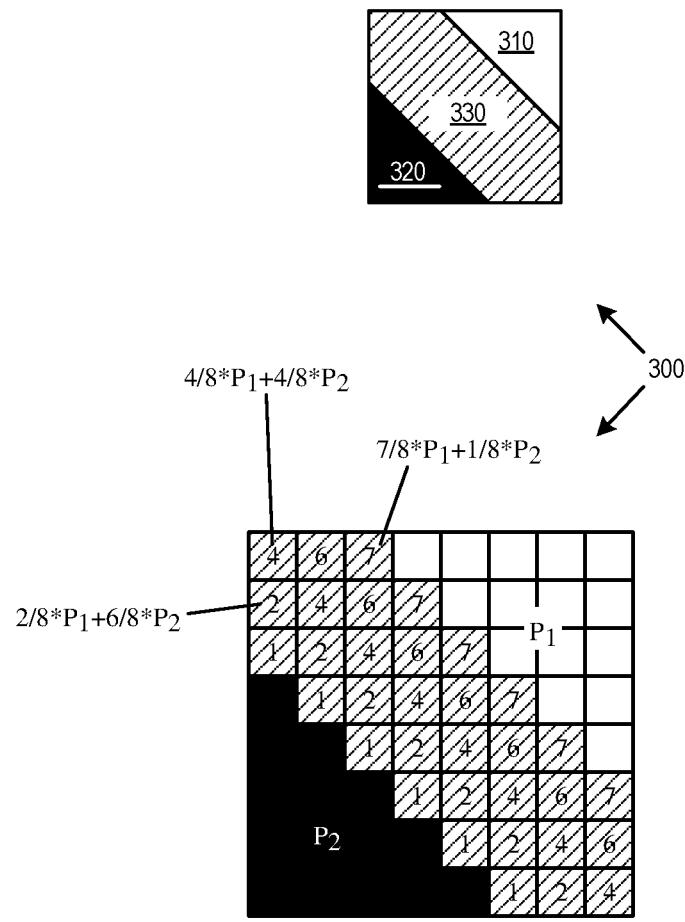
FIG. 3 illustrates the adaptive weighting that is applied along the diagonal edge between the two triangular prediction units.

FIG. 3 illustrates an example of the adaptive weighting that is applied along the diagonal edge between the two triangular prediction units of a CU. A first weighting factor groups of {7/8, 6/8, 4/8, 2/8, 1/8} and {7/8, 4/8, 1/8} are used for the luminance and the chrominance samples, respectively. A second weighting factor group: {7/8, 6/8, 5/8, 4/8, 3/8, 2/8, 1/8} and {6/8, 4/8, 2/8} are used for the luminance and the chrominance samples, respectively. One weighting factor group is selected based on the comparison of the motion vectors of two triangular prediction units. The second weighting factor group is used when the reference pictures of the two triangular prediction units are different from each other or their motion vector difference is larger than 16 pixels. Otherwise, the first weighting factor group is used.

As illustrated, a CU 300 is divided into a first triangular region 310, a second triangular region 320, and a diagonal edge region 330. The first region 310 is coded by a first prediction ($P_1$). The second triangular region is coded by a second prediction ($P_2$). The diagonal edge region 330 is coded by weighted sum of the predictions from the first triangular region and second triangular region (e.g., 7/8*$P_1$+ 1/8*$P_2$). The weighting factors are different for different pixel positions. In some embodiments, $P_1$ is generated by inter prediction and $P_2$ is generated by intra prediction such that the diagonal edge region 330 is coded by MH mode for Intra. In some embodiments, $P_1$ is generated by a first inter prediction (e.g., based on a first MV or merge candidate) and $P_2$ is generated by a second inter prediction (e.g., based on a second MV or merge candidate) such that the diagonal edge region 330 is coded by MH mode for Inter. In other words, TPM is a coding mode that includes modifying an inter-prediction generated based on one merge candidate ($P_1$) by weighted sum with another inter-prediction that is generated based on another merge candidate ($P_2$). The diagonal edge region 330 may also be referred to as the overlap prediction region (overlap of $P_1$ and $P_2$).

V. Signaling for Multi-Hypothesis Prediction Mode

Both CIIP and TPM generate a final prediction of current CU with two candidates. Either CIIP or TPM can be viewed as a type of multi-hypothesis prediction merge mode (MH merge or combined prediction mode or blending prediction mode), where one hypothesis of prediction is generated by one candidate and another hypothesis of prediction is generated by another candidate. For CIIP, one candidate is from intra mode and the other candidate is from merge mode. As for TPM, the two candidates are from the candidate list for merge mode.

In some embodiments, multi-hypothesis mode is used to improve Inter prediction, which is an improved method for Skip and/or Merge modes. In original Skip and Merge mode, one Merge index is used to select one motion candidate, which may be either uni-prediction or bi-prediction derived by the candidate itself, from the Merge candidate list. The generated motion compensated predictor is referred to as the first hypothesis (or first prediction) in some embodiments. Under Multi-hypothesis mode, a second hypothesis is produced in addition to the first hypothesis. The second hypothesis of predictors can be generated by motion compensation from a motion candidate based on an inter prediction mode, (e.g., Merge or Skip modes), or by intra prediction based on an intra prediction mode.

When the second hypothesis (or second prediction) is generated by an Intra prediction mode, the Multi-hypothesis mode is referred to as MH mode for Intra or MH mode Intra or MH Intra or Inter-intra mode. A CU coded by CIIP is coded by using MH mode for Intra. When the second hypothesis is generated by motion compensation by a motion candidate or an inter prediction mode (e.g., Merge or Skip mode), the Multi-hypothesis mode is referred to as MH mode for Inter or MH mode Inter or MH Inter (or also called as MH mode for Merge or MH Merge). A CU coded by TPM is coded by using MH mode for Inter.

For Multi-hypothesis mode, each Multi-hypothesis candidate (or called each candidate with Multi-hypothesis) contains one or more motion candidates (i.e., first hypothesis) and/or one intra prediction mode (i.e., second hypothesis), where the motion candidates are selected from a Candidate List I and/or the intra prediction mode is selected from a Candidate List II. For MH mode for intra, each Multi-hypothesis candidate (or each candidate with Multi-hypothesis) contains one motion candidate and one Intra prediction mode, where the motion candidate is selected from Candidate List I and the intra prediction mode is fixed to be one mode (e.g. planar) or selected from Candidate List II. MH mode for Inter uses two motion candidates, and at least one of the two motion candidates is derived from Candidate List I. In some embodiments, Candidate List I is identical to the Merge candidates list of the current block and that both motion candidates of a Multi-hypothesis candidate of MH mode for inter are selected from Candidate List I. In some embodiments, the Candidate List I is a subset of the Merge candidate list. In some embodiments, for MH mode for inter, each of the two motions used to generate the prediction for each prediction unit is indicated with a signaled index. When the index refers to a bi-prediction motion candidate in Candidate List I, the motion for list-0 or list-1 is chosen according to the index. When the index refers to a uni-prediction motion candidate in Candidate List I, the uni-prediction motion is used.

Figure 4A:
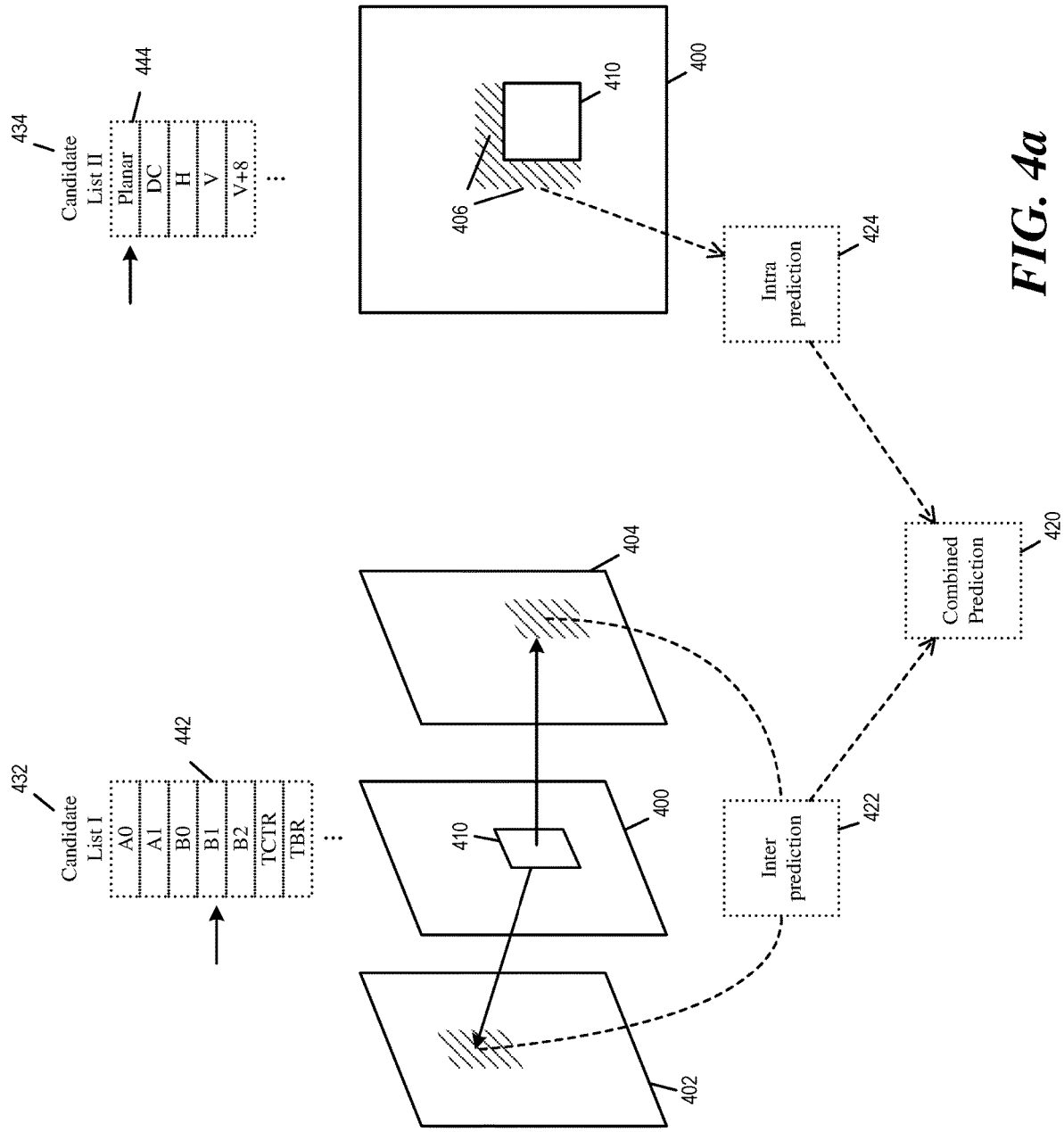
FIG. 4a conceptually illustrate encoding or decoding a block of pixels by using MH Mode for Intra.

FIG. 4a conceptually illustrate encoding or decoding a block of pixels by using MH Mode for Intra. The figure illustrates a video picture 400 that is currently being encoded or decoded by a video coder. The video picture 400 includes a block of pixels 410 that is currently being encoded or decoded as a current block. The current block 410 is coded by MH mode for intra, specifically, a combined prediction 420 is generated based on a first prediction 422 (first hypothesis) of the current block 410 and a second prediction 424 (second hypothesis) of the current block 410. The combined prediction 420 is then used to reconstruct the current block 410.

The current block 410 is being coded by using MH mode for Intra. Specifically, the first prediction is obtained by inter-prediction based on at least one of reference frames 402 and 404. The second prediction 424 is obtained by intra-prediction based on neighboring pixels 406 of the current block 410. As illustrated, the first prediction 422 is generated based on an inter-prediction mode or a motion candidate 442 that is selected from a first candidate list 432 (Candidate List I) having one or more candidate inter-prediction modes. The candidate list I can be the Merge candidate list of the current block 410. The second prediction 424 is generated based on an intra-prediction mode 444 that is pre-defined as one intra prediction mode (e.g. planar) or selected from a second candidate list 434 (Candidate List II) having one or more candidate intra-prediction modes. If only one intra prediction mode (e.g. planar) is used for MH for intra, the intra prediction mode for MH for intra is set as that intra prediction mode without signaling.

Figure 4B:
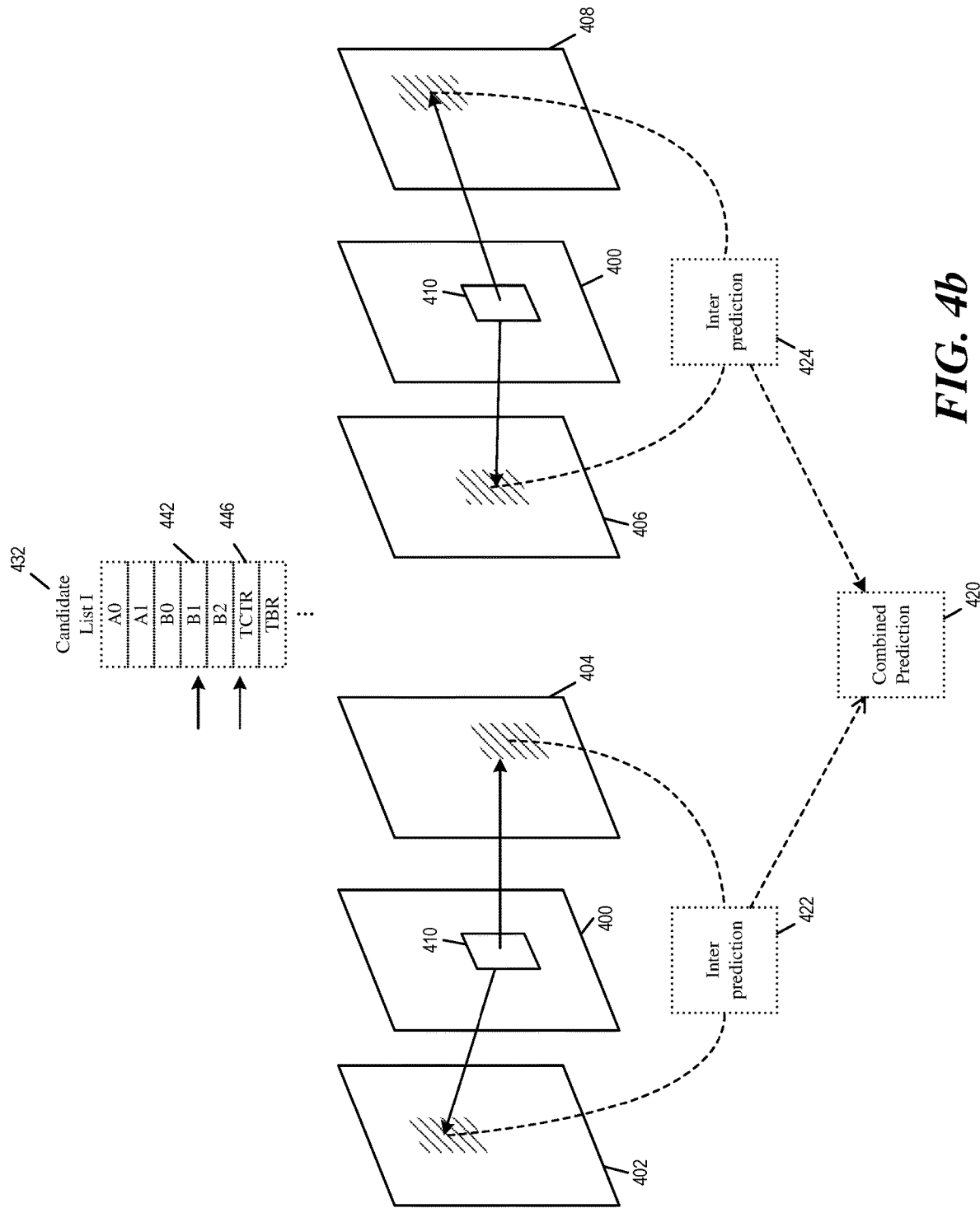
FIG. 4b illustrates the current block being coded by using MH mode for Inter.

FIG. 4b illustrates the current block 410 being coded by using MH mode for Inter. Specifically, the first prediction 422 is obtained by inter-prediction based on at least one of reference frames 402 and 404. The second prediction 424 is obtained by inter-prediction based on at least one of reference frames 406 and 408. As illustrated, the first prediction 422 is generated based on an inter-prediction mode or a motion candidate 442 (first prediction mode) that is selected from the first candidate list 432 (Candidate List I). The second prediction 424 is generated based on an inter-prediction mode or a motion candidate 446 that is also selected from the first candidate list 432 (Candidate List I). The candidate list I can be the Merge candidate list of the current block.

In some embodiments, when MH mode for Intra is supported, one flag is signaled (for example, to represent whether MH mode for Intra is applied) in addition to the original syntax for merge mode. Such a flag may be represented or indicated by a syntax element in a bitstream. In some embodiment, if the flag is on, one additional Intra mode index is signaled to indicate the Intra prediction mode from Candidate List II. In some embodiment, if the flag is on, the intra prediction mode for MH mode for intra (e.g., CIIP, or any one of MH modes for intra) is implicitly selected from Candidate List II or implicitly assigned with one intra prediction mode (for example, without one additional Intra mode index). In some embodiments, when the flag is off, MH mode for inter (e.g. TPM, or any one of other MH modes for inter which has different shapes of prediction units) can be used.

In some embodiments, the video codec (video encoder or video decoder) removes all bi-prediction cases in CIIP. That is, the video codec activates CIIP only when the current merge candidate is uni-prediction. In some embodiments, the video codec removes all bi-prediction candidates for merge candidates for CIIP. In some embodiments, the video codec retrieves L0 information of one bi-prediction (merge candidate) and changes it into a uni-prediction candidate and for CIIP. In some embodiment, the video codec retrieves L1 information of one bi-prediction (merge candidate) and changes it into a uni-prediction candidate for CIIP. By removing all bi-prediction behavior of CIIP, related syntax elements can be saved or omitted from transmission.

In some embodiments, when generating an inter prediction for CIIP mode, a motion candidate with bi-prediction is turned into uni-prediction according to one predefined rule. In some embodiments, the predefined rule specifies or chooses List-0 or List-1 motion vector depending on the POC distance. When the distance, denoted as $D_1$, between the current POC (or the POC of the current picture) and the POC (of the reference picture) referred by List-x motion vector, where x is 0 or 1, is smaller than the distance, denoted as $D_2$, between the current POC and the POC referred by List-y motion vector, where y is 0 or 1 and y is not equal to be x, List-x motion vector is selected to generate the inter prediction for CIIP. If $D_1$ is the same as $D_2$ or the difference of $D_1$ and $D_2$ is smaller than a threshold, List-x motion vector, where x is predefined to be 0 or 1, is selected to generate the inter prediction for CIIP. In some other embodiment, the predefined rule is to always choose List-x motion vector, where x is predefined to be 0 or 1. In some other embodiment, this bi-to-uni prediction scheme can be applied to motion compensation to generate the prediction. When the motion information for the current-coded CIIP CU is saved for referencing by the following or subsequent CUs, the motion information before applying this bi-to-uni prediction scheme is used. In some embodiment, this bi-to-uni prediction scheme is applied after generating the merge candidate list for CIIP. Processes such as motion compensation and/or motion information saving and/or de-blocking may use the generated uni-prediction motion information.

In some embodiments, a new candidate list formed by uni-prediction motion candidates is built for CIIP. In some embodiment, this candidate list can be generated from the merge candidate list for regular merge mode according to a predefined rule. For example, the predefined rule may specify that the bi-prediction motion candidates be ignored when generating the candidate list like what regular merge mode does. The length of this new candidate list for CIIP can be equal to or less than that for regular merge mode. For another example, the predefined rule may specify that the candidate list for CIIP re-uses the candidate list for TPM or that the candidate list for CIIP be re-used for TPM. The above-proposed methods can be combined with an implicit rule or an explicit rule. The implicit rule may depend on the block width or height or area and the explicit rule can be signaling a flag at CU, CTU, slice, tile, tile group, picture, SPS, PPS level, or etc.

In some embodiments, CIIP and TPM are classified into a group for combined prediction modes and the syntax for CIIP and TPM is also unified instead of using two separate flags to decide whether to use CIIP and whether to use TPM. The unification scheme is according to the following: When the enabling conditions for the group for combined prediction modes (For example, the union set of the enabling conditions for CIIP and TPM, including high-level syntax, size constraint, supported modes, or slice type, are satisfied, CIIP or TPM can be enabled or disabled with the unified syntax. First, a first bin is signaled (or a first flag is signaled using the first bin) to indicate whether the multi-hypothesis prediction mode is applied. Second, if the first flag indicates that multi-hypothesis prediction mode is applied, a second bin is signaled (or a second flag is signaled using the second bin) to indicate one of CIIP and TPM is applied. For example, when the first bin (or the first flag) is equal to 0, non-multi-hypothesis prediction mode such as regular merge mode is applied; otherwise, multi-hypothesis prediction mode such as CIIP or TPM is applied. When the first bin (or the first flag) indicates that multi-hypothesis prediction mode is applied (regular_merge_flag equal to 0), the second flag is signaled. When the second bin (or the second flag) is equal to 0, TPM is applied and additional syntax for TPM may be required (e.g. the additional syntax for TPM is to indicate the two motion candidates for TPM or the partitioning direction of TPM). When the second bin (or the second flag) is equal to 1, CIIP is applied and additional syntax for CIIP may be required (e.g. the additional syntax for CIIP is to indicate the two candidates for CIIP). An example of enabling conditions for the group for combined prediction modes include (1) The high level syntax CIIP and (2) TPM is turned on.

In some embodiment, the first bin and the second bin are signaled with truncated unary codewords or fixed length codewords. In some embodiment, one or more bins are signaled with context (for entropy encoding or decoding). In some embodiment, the contexts are chosen depending on the block width or height or area or neighboring block properties or the selected motion candidate or the selected intra prediction mode.

Figure 5:
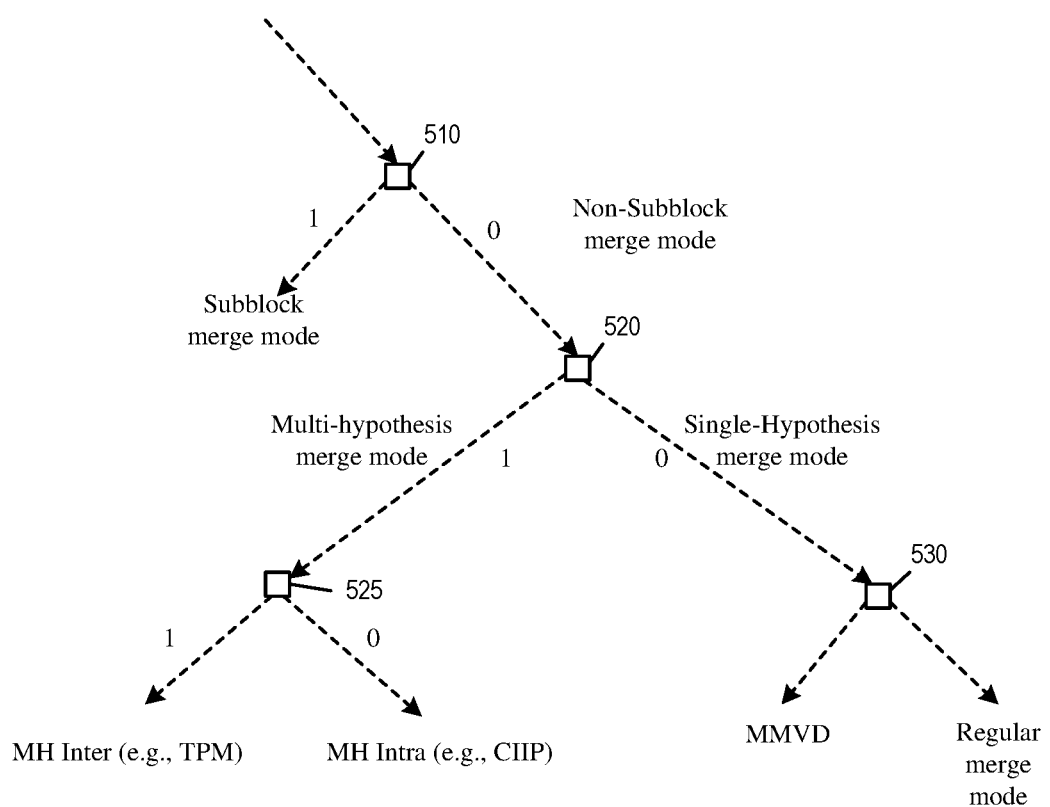
FIG. 5 conceptually illustrates an example flow of syntax elements for enabling or disabling various coding modes or merge tools.

FIG. 5 conceptually illustrates an example flow of syntax elements for enabling or disabling various coding modes or merge tools. The syntax elements are parts of a bitstream that is process by a video codec. The flow of syntax elements include flags that correspond to classification of different coding modes or merge tools. The flags may be coded in the bitstream as bins.

As illustrated, merge modes are classified (by flag 510) into subblock merge mode and non-subblock merge mode. Non-subblock merge modes are further classified (by flag 520) into multi-hypothesis merge modes (irregular merge modes) and single hypothesis merge modes (regular merge modes). Multi-hypothesis merge modes are further classified (by flag 525) into inter-inter merge mode (e.g., TPM) and inter-intra merge mode (e.g., CIIP). Single hypothesis merge modes are further classified (by flag 530) into MMVD merge mode and traditional merge mode (only merge index is required). Each mode has their own enabling conditions such as high-level control and size constraint, and a certain mode can be enabled only when all of its enabling conditions are satisfied. Therefore, the group, consisting multi-hypothesis merge modes, may only contain CIIP (or TPM) when the enabling conditions for TPM (or CIIP) are not satisfied. When the group contains only one multi-hypothesis mode, if the first flag indicates to the group, the only one multi-hypothesis mode is used without signaling. When the group contains no multi-hypothesis mode, the first flag (e.g. regular_merge_flag) is not signaled and can be inferred to indicate regular merge modes.

All combinations of above can be decided with an implicit rule or an explicit rule. The implicit rule may depend on the block width, height, area, block size aspect ratio, color component, or picture type. The explicit rule can be signaled by a flag at CU, CTU, slice, tile, tile group, picture, SPS, PPS level, or etc.

VI. Example Video Encoder

Figure 6:
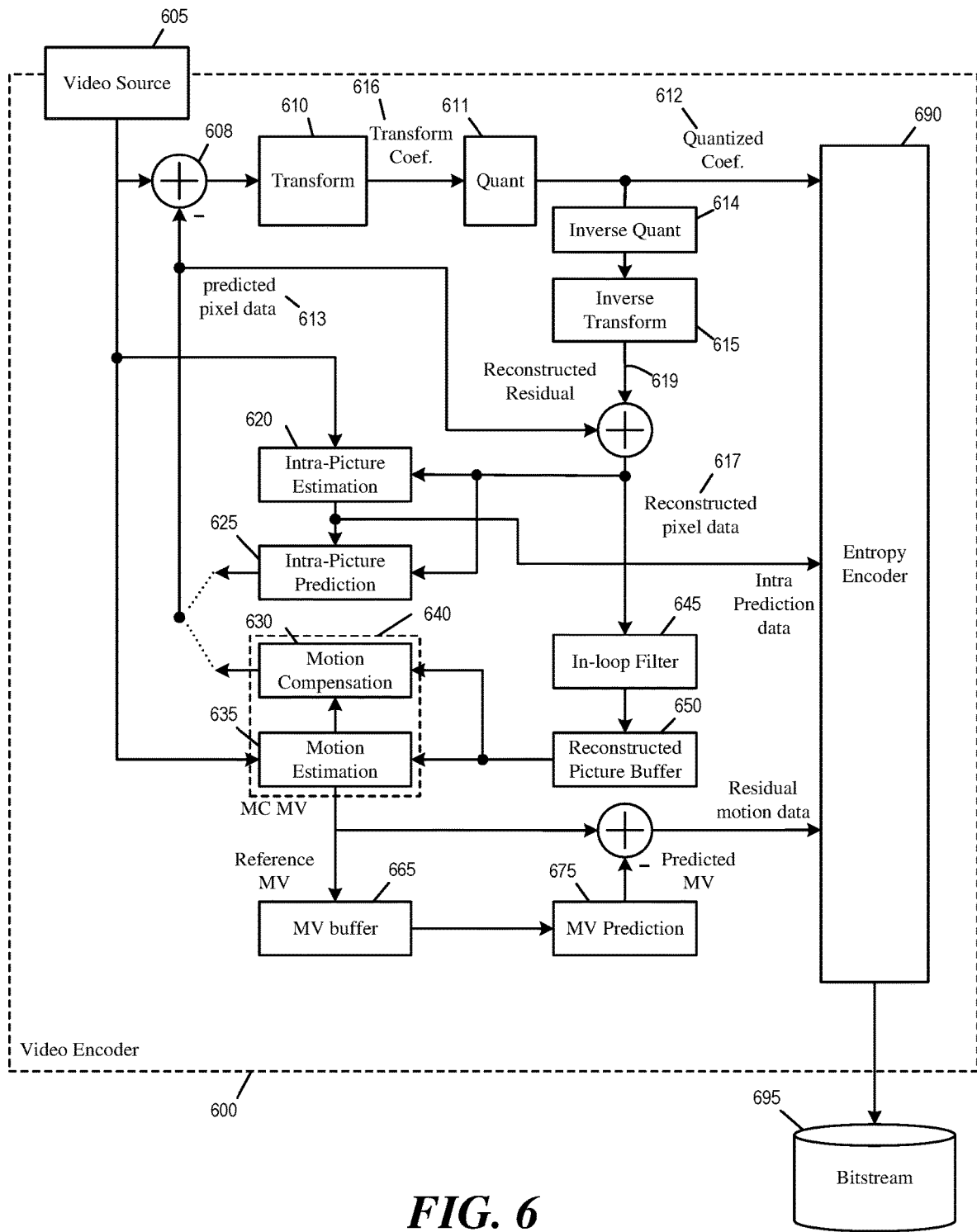
FIG. 6 illustrates an example video encoder that supports different types of merge modes.

FIG. 6 illustrates an example video encoder 600 that supports different types of merge modes. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625. The transform module 610 converts the difference (or the residual pixel data or residual signal 609) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
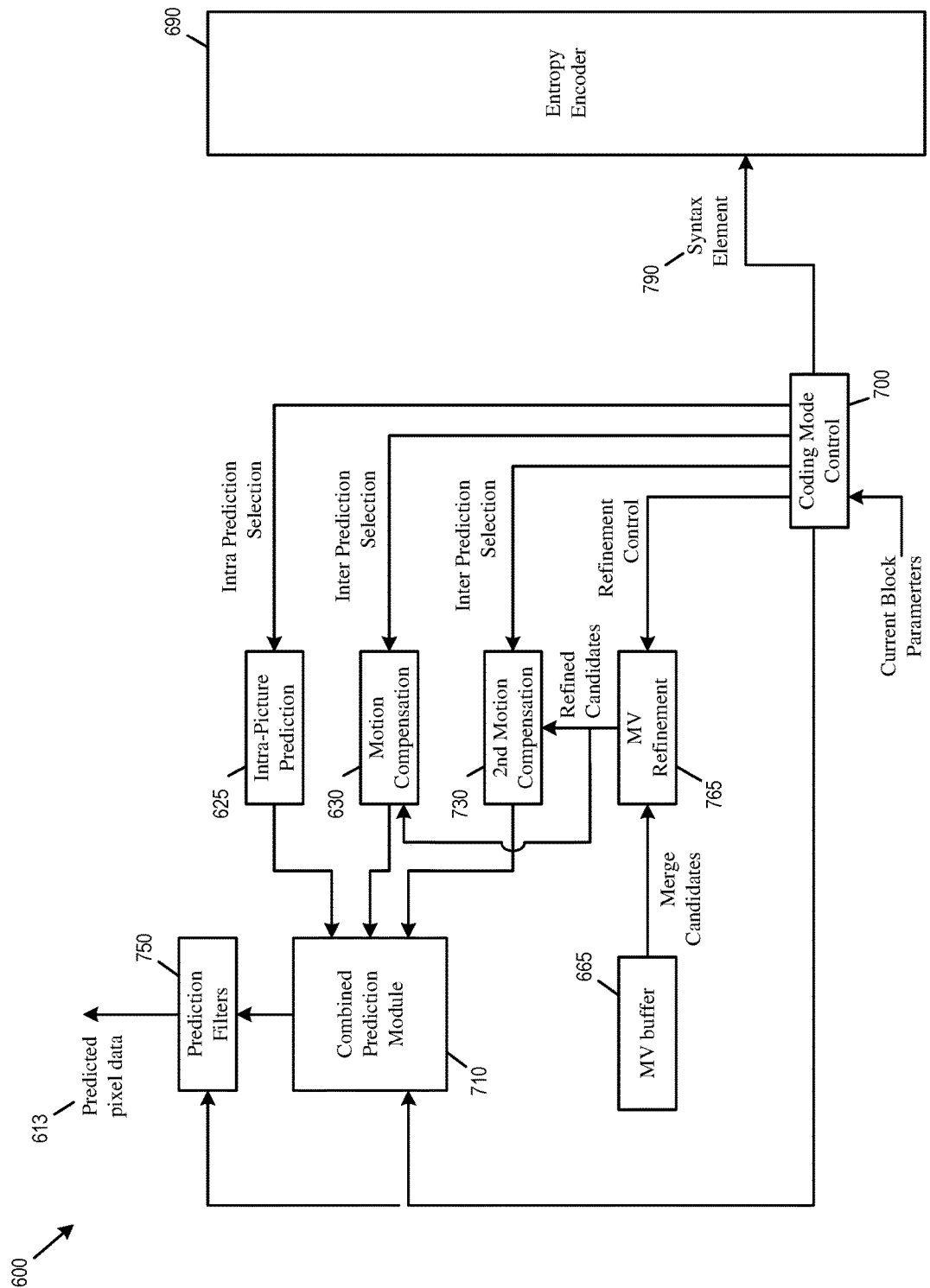
FIG. 7 illustrates portions of the video encoder that supports flags for classifying different types of merge modes.

FIG. 7 illustrates portions of the video encoder 600 that supports flags for classifying different types of merge modes. As illustrated, the video encoder 600 implements a combined prediction module 710 that may receive intra-prediction values generated by the intra-picture prediction module 625. The combined prediction module 710 may also receive inter-prediction values from the motion compensation module 630, as well as a second motion compensation module 730. The combined prediction module 710 in turn generates the predicted pixel data 613, which may be further filtered by a set of prediction filters 750.

The MV buffer 665 provides the merge candidates to the motion compensation modules 630 and 730. The MV buffer 665 also stores the motion information and the mode directions used to encode the current block for use by subsequent blocks. The merge candidates may be altered, expanded, and/or refined by a MV refinement module 765.

A coding mode (or tool) control module 700 controls the operations of the intra-picture prediction module 625, the motion compensation module 630, the second motion compensation module 730, the MV refinement module 765, the combined prediction module 710, and the prediction filters 750.

The coding mode control 700 may enable the MV refinement module 765 to perform MV refinement operations by searching for a refined MV or computing a gradient based MV adjustment. The coding mode control module 700 may enable the intra-prediction module 625 and the motion compensation module 630 to implement MH mode Intra (or Inter-Intra) mode (e.g., CIIP). The coding mode control module 700 may enable the motion compensation module 630 and the second motion compensation module 730 to implement MH mode Inter mode (e.g., for the diagonal edge region of TPM).

The coding mode control module 700 may enable the combined prediction module 710 to adopt different weighting schemes when combining prediction signals from intra-picture prediction module 625, the motion compensation module 630, and/or the second motion compensation module 730 in order to implement coding modes such as CIIP and TPM. The coding mode control 700 may also enable the prediction filters 750 to apply filtering on the predicted pixel data 613 or the reconstructed pixel data 617.

The coding mode control module 700 also determines which coding modes to enable and/or disable for coding the current block. The coding mode control module 700 then controls the operations of the intra-picture prediction module 625, the motion compensation module 630, the second motion compensation module 730, the MV refinement module 765, the combined prediction module 710, and the prediction filters 750 to enable and/or disable specific coding modes.

The coding mode control 700 generates or signals a syntax element 790 to the entropy encoder 690 to indicate that one or more of the coding modes are enabled. The video encoder 600 may also disable one or more other coding modes. In some embodiments, a first syntax element (e.g., a first flag) is used to indicate whether a multi-hypothesis prediction mode is applied and a second syntax element (e.g., a second flag) is used to indicate whether CIIP or TPM is applied. The first and second elements are correspondingly coded as a first bin and a second bin by the entropy encoder 690. In some embodiments, the second bin for deciding between CIIP and TPM is signaled only if the first bin indicates that multi-hypothesis mode is enabled.

Figure 8:
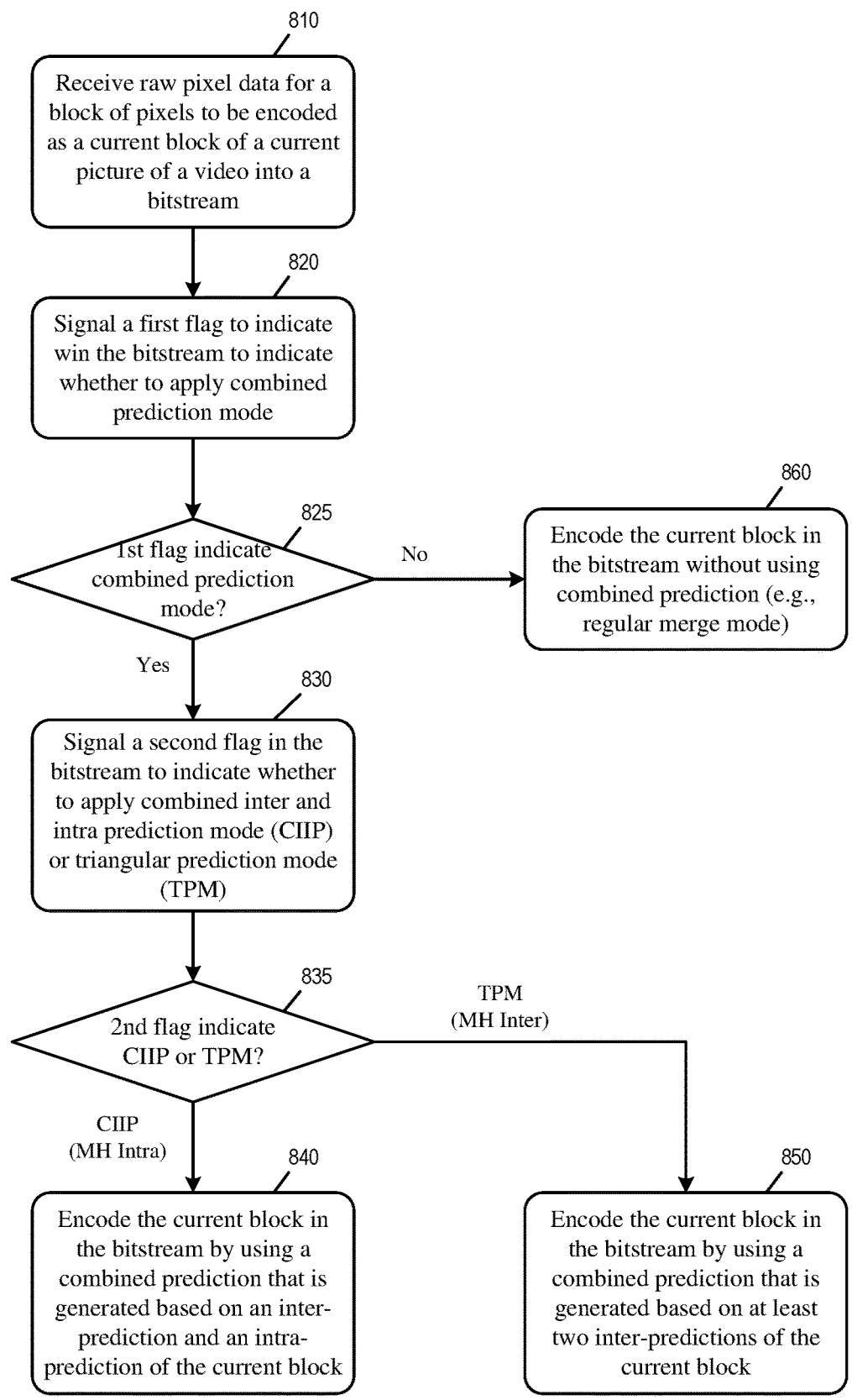
FIG. 8 conceptually illustrates a process for selecting a multi-hypothesis merge mode to encode a block of pixels in a video picture.

FIG. 8 conceptually illustrates a process 800 for selecting a multi-hypothesis merge mode to encode a block of pixels in a video picture. In some embodiments, one or more processing units (e.g., a processor) of a computing device implementing the encoder 600 performs the process 800 by executing instructions stored in a computer readable medium. In some embodiments, an electronic apparatus implementing the encoder 600 performs the process 800.

The encoder receives (at block 810) raw pixel data for a block of pixels to be encoded as a current block of a current picture of a video into a bitstream.

When the enabling conditions for the combined prediction modes are satisfied, the encoder signals (at block 820) a first flag in the bitstream to indicate whether to apply combined prediction mode. The encoder determines (at block 825) whether to apply combined prediction mode (e.g., multi-hypothesis merge mode) to encode the current block based on the first flag. If the first flag indicates that combined prediction mode is to be applied, the process proceeds to block 830. If the first flag indicates that combined prediction mode is not to be applied, the encoder encodes (at block 860) the current block in the bitstream without using combined prediction modes (e.g., without using multi-hypothesis merge mode or blending merge modes.)

At block 830, the encoder signals a second flag in the bitstream to indicate whether to apply combined inter and intra prediction mode or triangle prediction mode. The combined inter and intra prediction mode and the triangle prediction mode are taken as a group for combined prediction modes. In some embodiments, the first combined prediction mode corresponds to MH intra or inter-intra merge mode such as CIIP, while the second combined prediction mode corresponds to MH inter or inter-inter merge mode such as TPM.

At block 835, the encoder determines whether to apply the combined inter and intra prediction mode or the triangle prediction mode based on the second flag. If the second flag indicates the combined inter and intra prediction mode, the process proceeds to block 840. If the second flag indicates the triangle prediction mode, the process proceeds to block 850.

At block 840, the encoder encodes the current block into the bitstream by using a combined prediction that is generated based on an inter-prediction and an intra-prediction.

At block 850, the encoder encodes the current block into the bitstream by using a combined prediction that is generated based on at least two inter-predictions.

VII. Example Video Decoder

Figure 9:
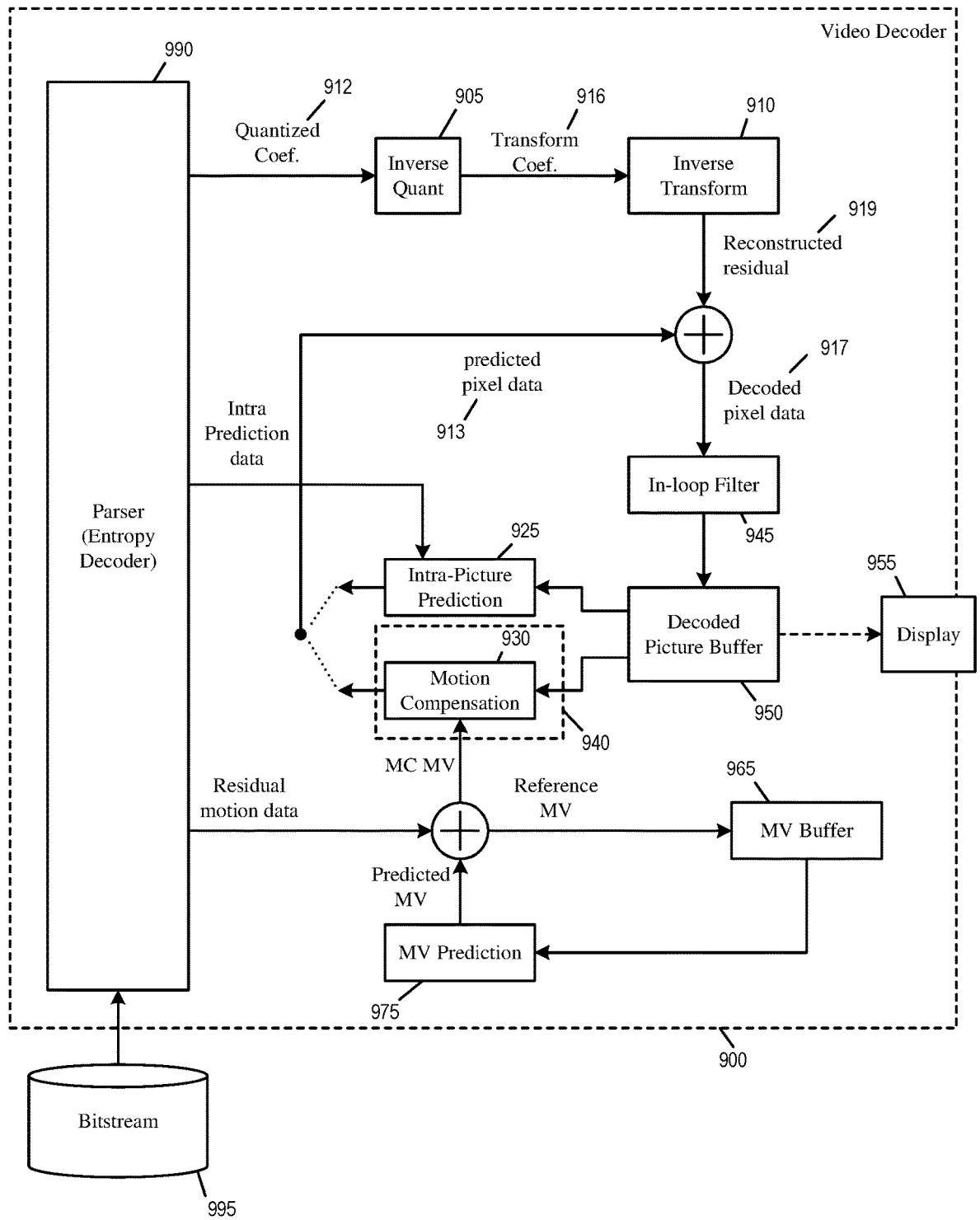
FIG. 9 illustrates an example video decoder that supports different types of merge modes.

FIG. 9 illustrates an example video decoder 900 that supports different types of merge modes. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 905, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 905 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
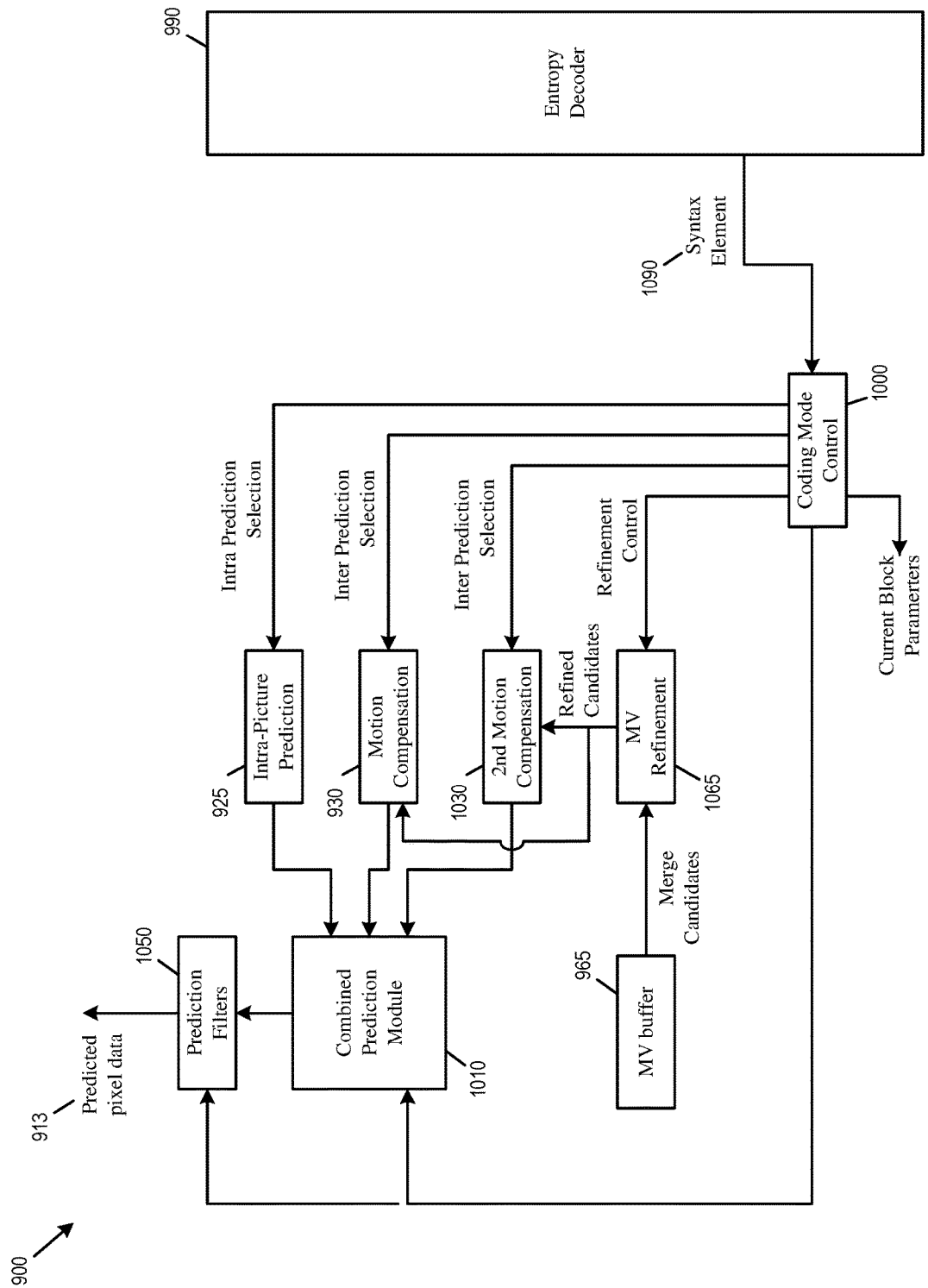
FIG. 10 illustrates portions of the video decoder that supports flags for classifying different types of merge modes.

FIG. 10 illustrates portions of the video decoder 900 that supports flags for classifying different types of merge modes. As illustrated, the video decoder 900 implements a combined prediction module 1010 that may receive intra-prediction values generated by the intra-picture prediction module 925. The combined prediction module 1010 may also receive inter-prediction values from the motion compensation module 930, as well as a second motion compensation module 1030. The combined prediction module 1010 in turn generates the predicted pixel data 913, which may be further filtered by a set of prediction filters 1050.

The MV buffer 965 provides the merge candidates to the motion compensation modules 930 and 1030. The MV buffer 965 also stores the motion information and the mode directions used to decode the current block for use by subsequent blocks. The merge candidates may be altered, expanded, and/or refined by a MV refinement module 1065.

A coding mode (or tool) control module 1000 controls the operations of the intra-picture prediction module 925, the motion compensation module 930, the second motion compensation module 1030, the MV refinement module 1065, the combined prediction module 1010, and the prediction filters 1050.

The coding mode control 1000 may enable the MV refinement module 1065 to perform MV refinement operations by searching for a refined MV or computing a gradient based MV adjustment. The coding mode control module 1000 may enable the intra-prediction module 925 and the motion compensation module 930 to implement MH mode Intra (or Inter-Intra) mode (e.g., CIIP). The coding mode control module 1000 may enable the motion compensation module 930 and the second motion compensation module 1030 to implement MH mode Inter mode (e.g., for the diagonal edge region of TPM).

The coding mode control module 1000 may enable the combined prediction module 1010 to adopt different weighting schemes when combining prediction signals from intra-picture prediction module 925, the motion compensation module 930, and/or the second motion compensation module 1030 in order to implement coding modes such as CIIP and TPM. The coding mode control 1000 may also enable the prediction filters 1050 to apply filtering on the predicted pixel data 913 or the decoded pixel data 917.

The coding mode control module 1000 also determines which coding modes to enable and/or disable for coding the current block. The coding mode control module 1000 then controls the operations of the intra-picture prediction module 925, the motion compensation module 930, the second motion compensation module 1030, the MV refinement module 1065, the combined prediction module 1010, and the prediction filters 1050 to enable and/or disable specific coding modes.

The coding mode control 1000 receives a syntax element 1090 from the entropy decoder 990 to indicate that one or more than one of the coding modes are enabled. The video decoder 900 may also disable one or more other coding modes. In some embodiments, a first syntax element (e.g., a first flag) is used to indicate whether a multi-hypothesis prediction mode is applied and a second syntax element (e.g., a second flag) is used to indicate whether CIIP or TPM is applied. The first and second elements are correspondingly decoded from a first bin and a second bin in the bitstream 995. In some embodiments, the second bin for deciding between CIIP and TPM is signaled only if the first bin indicates that multi-hypothesis mode is enabled.

Figure 11:
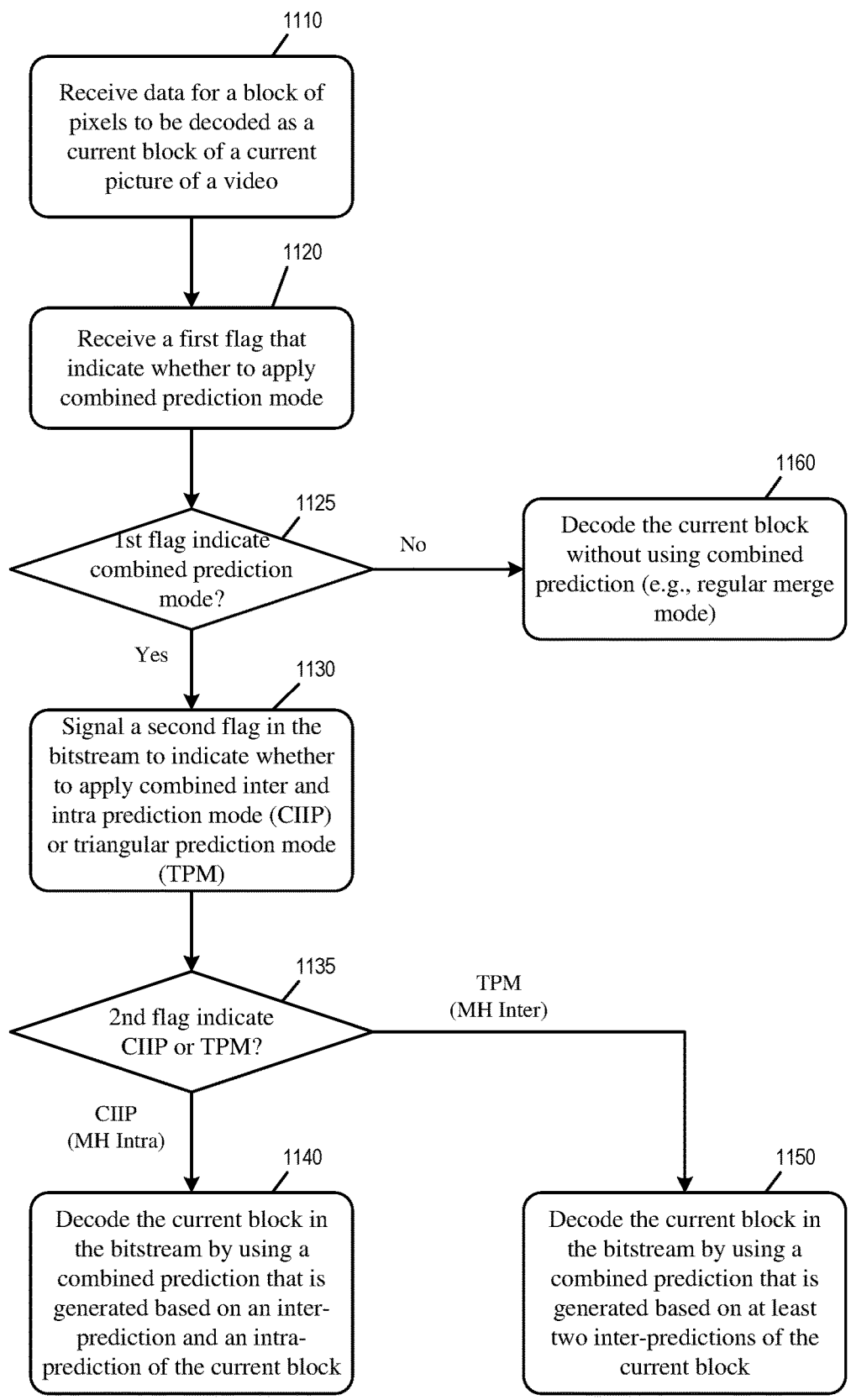
FIG. 11 conceptually illustrates a process for selecting a multi-hypothesis merge mode to decode a block of pixels in a video picture.

FIG. 11 conceptually illustrates a process 1100 for selecting a multi-hypothesis merge mode to decode a block of pixels in a video picture. In some embodiments, one or more processing units (e.g., a processor) of a computing device implementing the decoder 900 performs the process 1100 by executing instructions stored in a computer readable medium. In some embodiments, an electronic apparatus implementing the decoder 900 performs the process 1100.

The decoder receives (at block 1110) data for a block of pixels to be decoded as a current block of a current picture of a video.

When the enabling conditions for the combined prediction modes are satisfied, the decoder receives (at block 1120) a first flag that indicates whether to apply combined prediction mode. The decoder determines (at block 1125) whether to apply combined prediction mode to decode the current block based on the first flag. If the first flag indicates that combined prediction mode is to be applied, the process proceeds to block 1130. If the first flag indicates that combined prediction mode is not to be applied, the decoder decodes (at block 1160) the current block in the bitstream without using combined prediction mode (e.g., without using multi-hypothesis merge mode or blending merge modes.)

At block 1130, the decoder receives a second flag that indicates whether to apply combined inter and intra prediction mode or triangle prediction mode. The combined inter and intra prediction mode and the triangle prediction mode are taken as a group for combined prediction modes. In some embodiments, the first combined prediction mode corresponds to MH intra or inter-intra merge mode such as CIIP, while the second combined prediction mode corresponds to MH inter or inter-inter merge mode such as TPM.

At block 1135, the decoder determines whether to apply the combined inter and intra prediction mode or the triangle prediction mode based on the second flag. If the second flag indicates the combined inter and intra prediction mode, the process proceeds to block 1140. If the second flag indicates the triangle prediction mode, the process proceeds to block 1150.

At block 1140, the decoder decodes the current block by using a combined prediction that is generated based on an inter-prediction and an intra-prediction.

At block 1150, the decoder decodes the current block by using a combined prediction that is generated based on at least two inter-predictions.

VIII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
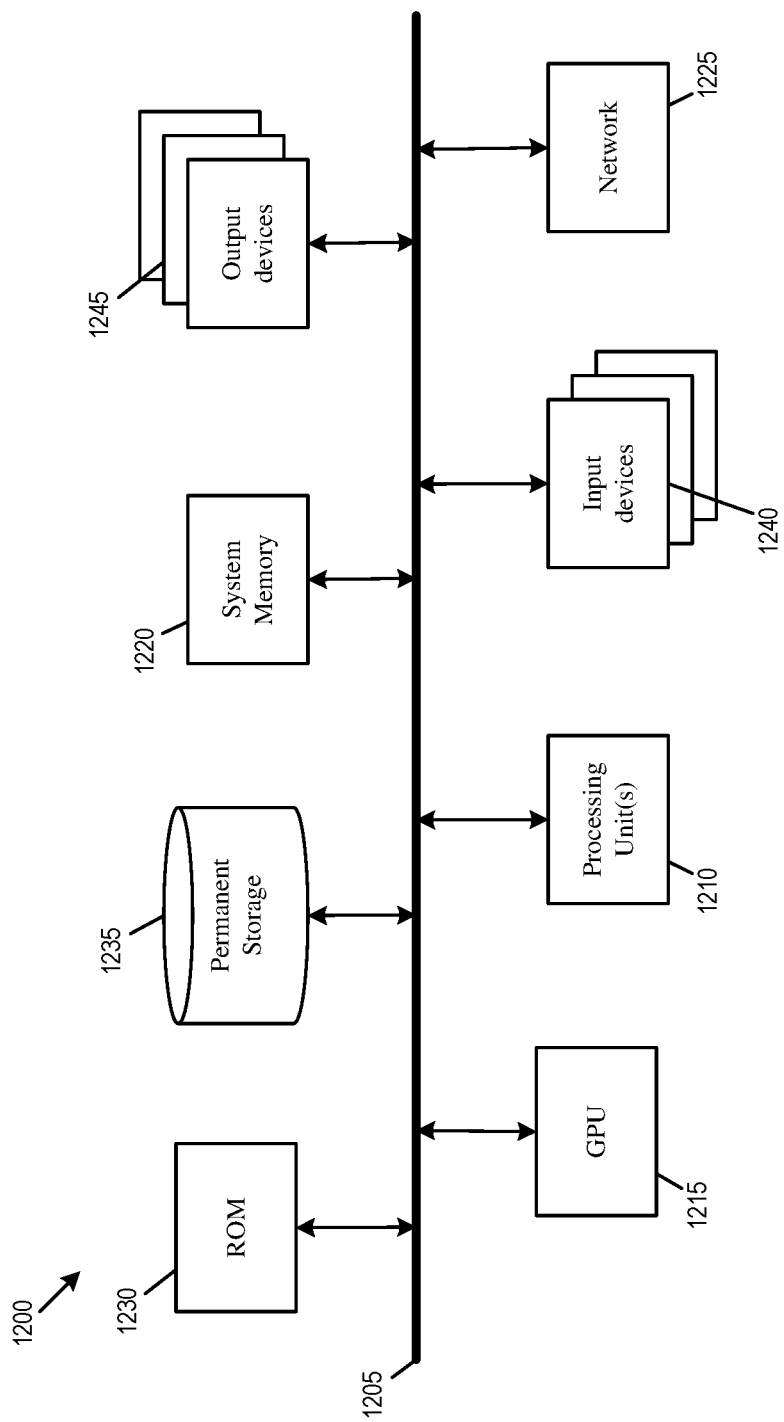
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alpha-numeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 8 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
   receiving, at a video codec, data to be encoded or decoded as a current block of a current picture of a video, wherein at least one of first and second flags indicate whether to apply combined inter and intra prediction mode or triangle prediction mode, wherein the combined inter and intra prediction mode and the triangle prediction mode are taken as a group for combined prediction modes; and
   decoding or encoding the current block,
   wherein when combined inter and intra prediction mode is applied, the current block is coded by using a combined prediction that is generated based on an inter-prediction and an intra-prediction,
   wherein when triangle prediction mode is applied, the current block is coded by using a combined prediction that is generated based on at least two inter-predictions, wherein the first flag indicates whether a multi-hypothesis prediction mode is applied to combine two prediction signals to generate a combined prediction for decoding or encoding the current block, wherein the first flag is coded by a first bin and the second flag is coded by a second bin that are signaled with different contexts, and wherein the first flag and the second flag are signaled using fixed length codewords.

2. The video coding method of claim 1, wherein the second flag selects combined inter and intra prediction mode or triangle prediction mode.

3. The video coding method of claim 1, wherein when triangle prediction mode is applied, the video codec combines a first inter-prediction signal with a second inter-prediction signal to generate the combined prediction for a diagonal region between two triangular prediction units of the current block.

4. The video coding method of claim 1, wherein when triangle prediction mode is applied, the video codec combines a first inter-prediction signal with a second inter-prediction signal to generate the combined prediction for an overlap prediction region that is defined based on a partitioning along a straight line bifurcating the current block.

5. The video coding method of claim 4, wherein the straight line is a diagonal line connecting two opposing vertices of the current block.

6. The video coding method of claim 4, wherein the combined prediction is a weighted sum of the first inter-prediction signal and the second inter-prediction signal.

7. The video coding method of claim 1, wherein at least one of first and second flags are coded by one or more bins that are signaled with one or more contexts that are chosen based on properties of a set of the current block or neighboring blocks of the current block.

8. The video coding method of claim 1, wherein at least one of first and second flags are coded by one or more bins that are signaled with one or more contexts that are chosen based on a selected motion candidate or a selected intra prediction mode.

9. An electronic apparatus comprising:
a video decoder circuit configured to perform operations comprising:
receiving data from a bitstream for a block of pixels to be decoded as a current block of a current picture of a video;
receiving at least one of first and second flags that indicate whether to apply combined inter and intra prediction mode or triangle prediction mode, wherein the combined inter and intra prediction mode and the triangle prediction mode are taken as a group for combined prediction modes; and
decoding the current block,
wherein when combined inter and intra prediction mode is applied, the current block is decoded by using a combined prediction that is generated based on an inter-prediction and an intra-prediction,
wherein when triangle prediction mode is applied, the current block is decoded by using a combined prediction that is generated based on at least two inter-predictions,
wherein the first flag indicates whether a multi-hypothesis prediction mode is applied to combine two prediction signals to generate a combined prediction for decoding or encoding the current block,
wherein the first flag is coded by a first bin and the second flag is coded by a second bin that are signaled with different contexts, and
wherein the first flag and the second flag are signaled using fixed length codewords.

10. An electronic apparatus comprising:
a video encoder circuit configured to perform operations comprising:
receiving raw pixel data for a block of pixels to be encoded as a current block of a current picture of a video into a bitstream;
signaling at least one of first and second flags in the bitstream to indicate whether to apply combined inter and intra prediction mode or triangle prediction mode, wherein the combined inter and intra prediction mode and the triangle prediction mode are taken as a group for combined prediction modes; and
encoding the current block,
wherein when combined inter and intra prediction mode is applied, the current block is encoded by a combined prediction that is generated based on an inter-prediction and an intra-prediction,
wherein when triangle prediction mode is applied, the current block is encoded by a combined prediction that is generated based on at least two different inter-predictions,
wherein the first flag indicates whether a multi-hypothesis prediction mode is applied to combine two prediction signals to generate a combined prediction for decoding or encoding the current block,
wherein the first flag is coded by a first bin and the second flag is coded by a second bin that are signaled with different contexts, and
wherein the first flag and the second flag are signaled using fixed length codewords.

* * * * *